(12) United States Patent
Tsutsumi et al.

(10) Patent No.: US 8,148,972 B2
(45) Date of Patent: Apr. 3, 2012

(54) FILTER CIRCUIT AND METHOD OF CONTROLLING SAME

(75) Inventors: Tsuyoshi Tsutsumi, Tokyo (JP); Eishi Matsuda, Iwate (JP)

(73) Assignee: NEC Corporation, Tokyo (JP)

( * ) Notice: Subject to any disclaimer, the term of this patent is extended or adjusted under 35 U.S.C. 154(b) by 449 days.

(21) Appl. No.: 12/399,345

(22) Filed: Mar. 6, 2009

(65) Prior Publication Data

US 2009/0224735 A1 Sep. 10, 2009

(30) Foreign Application Priority Data

Mar. 6, 2008 (JP) .................................. 2008-056538

(51) Int. Cl.
*H03H 1/00* (2006.01)
(52) U.S. Cl. ....................................................... 323/364

(58) Field of Classification Search ................... 363/47, 363/48, 50, 52, 53, 55; 323/355, 358, 364
See application file for complete search history.

(56) References Cited

U.S. PATENT DOCUMENTS

| | | | | |
|---|---|---|---|---|
| 5,574,635 A | * | 11/1996 | Philippe | 363/124 |
| 5,693,988 A | * | 12/1997 | Bettega et al. | 307/105 |
| 6,151,228 A | * | 11/2000 | Miyazaki et al. | 363/48 |
| 6,674,273 B2 | * | 1/2004 | Oglesbee | 323/284 |

FOREIGN PATENT DOCUMENTS

JP 2003274651 A 9/2003

* cited by examiner

*Primary Examiner* — Matthew Nguyen

(57) ABSTRACT

Disclosed is a filter circuit that includes means for monitoring currents flowing through positive and negative windings of a common-mode noise filter, and means for performing an adjustment based on the result of monitoring so as to equalize the current flowing positive and negative windings.

4 Claims, 4 Drawing Sheets

FILTER CIRCUIT AND METHOD OF CONTROLLING SAME

REFERENCE TO RELATED APPLICATION

This application is based on and claims the benefit of the priority of Japanese patent application No. 2008-056538 filed on Mar. 6, 2008, the disclosure of which is incorporated herein in its entirety by reference thereto.

FIELD OF THE INVENTION

This invention relates to a filter circuit and, more particularly, to a filter circuit having a common-mode choke coil and a method of controlling this circuit.

BACKGROUND ART

In order to improve reliability and enhance the current supply capability in a filter having a common-mode choke coil, use is made of an arrangement (a redundant arrangement) in which a plurality of filter circuits alone or modules in which a filter circuit is additionally provided with a voltage monitoring function or over-current protection function (these are referred to as "filter modules") are disposed in parallel.

FIG. 4 is a diagram illustrating a typical example of an arrangement in which a plurality of filter circuits are connected in parallel. It should be noted that an X capacitor (across-the-the capacitor), Y capacitor (line-bypass capacitor) and normal-mode choke coil, etc., are not shown in FIG. 4.

As shown in FIG. 4, a filter comprising a common-mode choke coil (abbreviated to "CMC") 1a and resistors (7a, 8a) and a filter comprising a common-mode choke coil (abbreviated to "CMC") 1b and resistors (7b, 8b) are arranged in parallel between an input and an output. The CMC functions as a filter that removes only common-mode noise without affecting a differential signal. More specifically, when a differential current flows, magnetic fluxes produced respectively by the two coils cancel each other out within the cores. When a common-mode current flows, the fluxes of the two coils strengthen each other within the cores, impedance across the ends of the coils is enlarged and the common-mode current is suppressed. Suppression of noise is the result.

By way of example, with regard to current on the positive side, the positive-side winding current of CMC 1a and the positive-side winding current of CMC 1b are not equal owing to a slight difference between the circuit resistance values 7a and 7b. Similarly, with regard also to the negative-side windings, the negative-side winding current of CMC 1a and the negative-side winding current of CMC 1b are not equal owing to a slight difference between the circuit resistance values 8a and 8b.

In a case where the ratios between the differences of the circuit resistance values (7a:7b, 8a:8b) are equal, the currents that flow into the CMC 1a and CMC 1b are different but the positive-side winding current and negative-side winding current when viewed in terms of each individual CMC are equal.

In actuality, however, this state is almost never attained and it is difficult to equalize the current that flows into the positive-side winding and the current that flows into the negative-side winding of each individual CMC used in the filter.

If the currents that flow into the positive-side and negative-side windings are not equal (i.e., if a current imbalance occurs), the core material used in the CMC saturates magnetically, inductance drops by a significant margin and a normal filter characteristic is no longer obtained.

As a technique relating to adjustment of current imbalance, Patent Document 1 discloses an arrangement in which ripple in a parallel-operating-type switching power supply unit is suppressed by equalizing reactor currents that flow into respective output reactors. The arrangement described in Patent Document 1 is entirely different from the filter circuit of the present invention, described later.

[Patent Document 1] Japanese Patent Kokai Publication No. JP-P2003-274651A

The entire disclosure of Patent Document 1 is incorporated herein by reference thereto. The following analyses are given by the present invention.

In the arrangement in which a plurality of filter circuits using CMCs are connected in parallel, as mentioned above, there are cases where operation stabilizes at different values for the positive-side and negative-side currents in each filter module. In such cases the inductance of the CMC within the filter module declines and the desired filter characteristic (low-pass characteristic) is not obtained.

More specifically, when a difference is produced between the positive and negative winding currents of the filter and an imbalance develops between the positive and negative winding currents of the CMC, a difference develops between a magnetic flux generated by the positive winding current and a magnetic flux negated by the negative winding current, which fluxes had been canceled out within the two coils of the CMC, magnetic fluxes are produced within the CMC core, the CMC core reaches magnetic saturation (the higher the magnetic permeability, the greater the tendency to saturate). Inductance declines owing to the saturation of the CMC core, high-frequency impedance of the CMC decreases and so does the amount of attenuation of common-mode noise of the filter. The cut-off frequency of common-mode noise rises. As a result, common-mode noise output from the apparatus increases and there is a decline in immunity to common-mode noise entered into the apparatus from the outside.

SUMMARY

Accordingly, an object of the present invention is to provide a filter circuit adapted so as to avoid a decline in impedance ascribable to magnetic saturation of a CMC core and obtain a desired characteristic, as well as a method of controlling this filter circuit.

In accordance with die present invention, there is provided a filter circuit comprising: a monitoring circuit for monitoring positive winding current and negative winding current of a common-mode choke coil; and an adjusting circuit for applying an adjustment based on result of monitoring the positive winding current and negative winding current in such a manner that balance is achieved between the positive winding current and negative winding current.

In the present invention, the monitoring circuit includes first and second current detecting circuits for detecting current values of the positive winding current and negative winding current of the common-mode choke coil.

In the present invention, the adjusting circuit includes: a differential amplifier that compares results of detection of the current values by the first and second current detecting circuits and produces a signal conforming to the result of comparison; and a first current control element and/or a second current control element inserted into a path, of the positive winding current and/or a path of the negative winding current of the common-mode choke coil, the first current control element and/or second current control element each receiving the signal output from the differential amplifier and varying a value of current flowing through the path into which the current control element is inserted.

In the present invention, the monitoring circuit includes first and second voltage-drop circuits into which the positive winding current and negative winding current of the common-mode choke coil flow for outputting voltages conforming to current values of respective ones of the winding currents.

In the present invention, the first and second voltage-drop circuits may output a mid-point voltage.

In the present invention, the adjusting circuit includes: a differential amplifier that compares a mid-point potential of the voltage across input side lines of the first and second voltage-drop circuits and a mid-point potential of the voltage across output side lines of the first and second voltage-drop circuits and produces a signal conforming to the result of comparison; and a first current control element and/or a second current control element inserted into a path of the positive winding current and/or a path of the negative winding current of the common-mode choke coil, the first current control element and/or second current control element each receiving the signal output from the differential amplifier and varying a value of current flowing through the path into which the current control element is inserted.

The present invention provides a filter circuit (noise filter) in which a plurality of the above-described filter circuits are provided in parallel between an input and an output.

In accordance with the present invention, there is provided a method of controlling a filter, comprising:
monitoring positive winding current and negative winding current of a common-mode choke coil; and
applying an adjustment based on result of monitoring in such a manner that balance is achieved between the positive winding current and negative winding current.

In accordance with the present invention, the currents that flow into the positive- and negative-side windings of a common-mode choke coil (CMC) are monitored and adjusted so as to become equal to each other, thereby preventing magnetic saturation of the CMC core and obtaining the desired characteristic.

Other features and advantages of the present invention will be apparent from the following description taken in conjunction with the accompanying drawings, in which, like reference characters designate the same or similar parts throughout the figures thereof.

PREFERRED MODES OF THE INVENTION

Exemplary embodiments of the present invention will be described below. In a case where a plurality of filter circuits are arranged in parallel, unless the currents that flow into the positive-side and negative-side windings of a common-mode choke coil (CMC) in each filter circuit are balanced, magnetic saturation occurs in the CMC, which uses a core material having a high magnetic permeability, and a normal filter characteristic can no longer be obtained, as described earlier.

Accordingly, in the present invention, it is so arranged that the currents that flow into the positive-side and negative-side windings are balanced so that a normal filter characteristic is obtained. More specifically, the currents that flow into the positive-side and negative-side windings of a CMC used in a filter circuit are monitored and automatically adjusted so as to become equal values. The desired filter characteristic is obtained even in a case where a plurality of filters are used.

Figure 1:
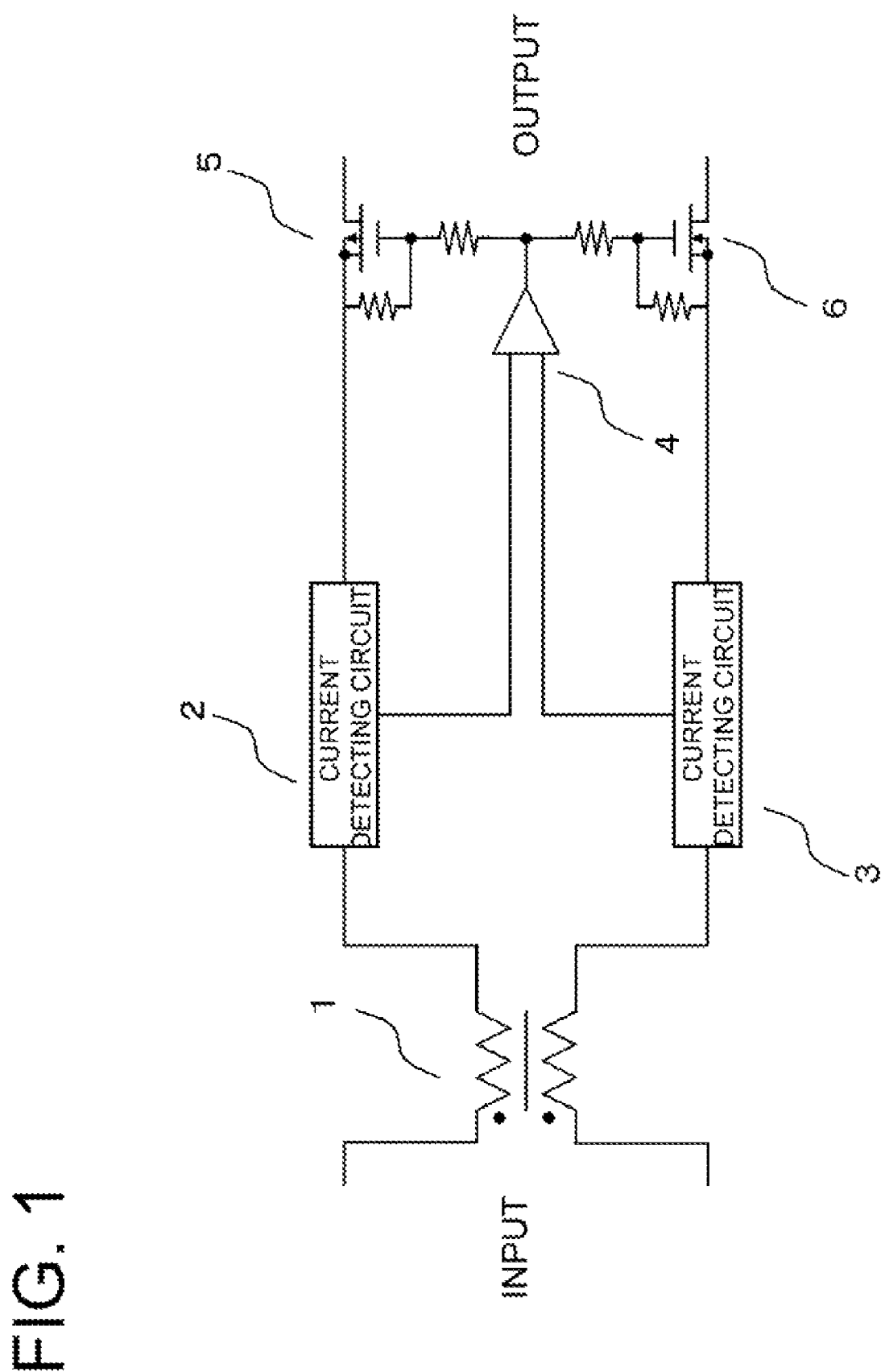
FIG. 1 is a diagram illustrating the configuration of a first exemplary embodiment of the present invention.

FIG. 1 is a diagram illustrating the configuration of a first exemplary embodiment of the present invention. FIG. 1 illustrates a CMC and peripheral portions as well as principal portions of the present invention in a filter circuit. In FIG. 1, an X capacitor (across-the-line capacitor), Y capacitor (line-bypass capacitor) and normal-mode choke coil, etc., are not shown.

The filter circuit shown in FIG. 1 includes a current detecting circuit 2 for detecting current that flows through one coil of a CMC 1; a current detecting circuit 3 for detecting current that flows through the other coil of the CMC 1; a differential amplifier 4 to which the results of current detection (output voltages) from respective ones of the current detecting circuits 2 and 3 are differentially applied; and a p-channel FET (Field Effect Transistor) 5 and n-channel FET 6 connected between the current detecting circuits 2 and 3 and outputs, respectively. Gates of these FETs 5 and 6 are connected via resistors to the output of the differential amplifier 4. The current detecting circuits 2 and 3 serve as a monitoring circuit for monitors positive winding current and negative winding current of the CMC, while the differential amplifier 4 and FETs 5 and 6 serves as an adjusting circuit for performing an adjustment based on the result of monitoring so as to equalize the positive and negative winding currents.

If the currents of the positive and negative windings of the CMC 1 are unbalanced, the gate voltage of the FET 5 or 6 is controlled by the output voltage of the differential amplifier 4, the current of the positive winding or negative winding is suppressed and feedback control is carried so as to achieve stable operation at the point where the currents of the positive and negative windings come into balance.

If, say, the current value detected by the current detecting circuit 2 is larger than the current value detected by the current detecting circuit 3, the output voltage of the current detecting circuit 2 also becomes larger than the output voltage of the current detecting circuit 3, the output voltage of the differential amplifier 4 rises, the both gate voltages of the p-channel FET 5 and n-channel FET 6 rise and, as a result, the source-to-drain current of the p-channel FET 5 decreases and the drain-to-source current of the n-channel FET 6 increases. That is, control is exercised in such a manner that the value of the current that flows through the current detecting circuit 2 (the positive winding current) decreases, the value of the current that flows through the current detecting circuit 3 (the negative winding current) increases and the currents balance each other. It should be noted that the p-channel FET 5 and n-channel FET 6 in FIG. 1 are described as examples of current control elements that vary the current value based on the output of the differential amplifier 4. However, as long as the current control element is one that is capable of controlling the current value linearly, any such element will suffice. For example, bipolar transistors (pnp bipolar transistor 5 and npn bipolar transistor 6), etc., are capable of being used.

Figure 2:
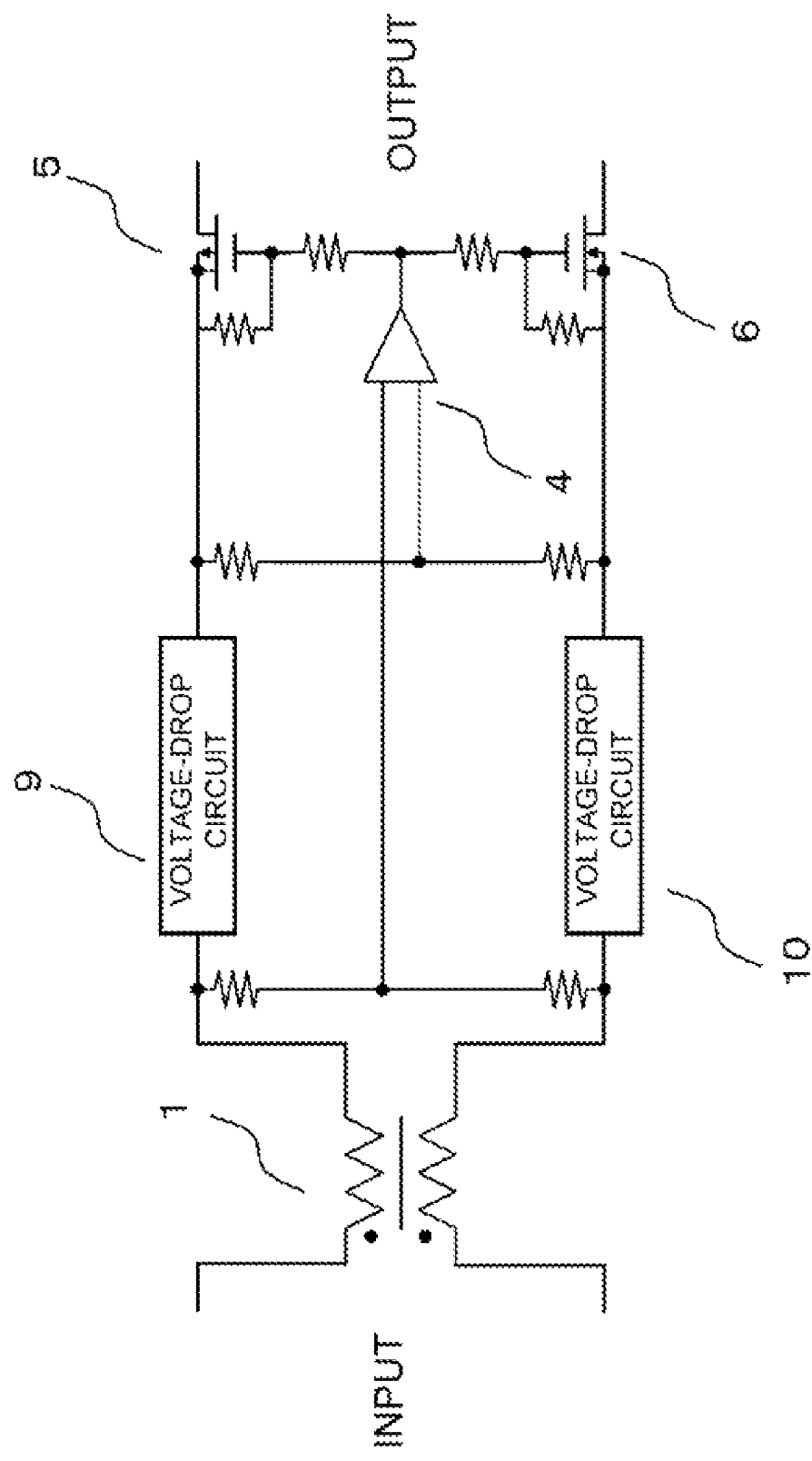
FIG. 2 is a diagram illustrating the configuration of a second exemplary embodiment of the present invention.

FIG. 2 is a diagram illustrating a second exemplary embodiment of the present invention. As shown in FIG. 2, the current detecting circuit 2 and current detecting circuit 3 of FIG. 1 are replaced by a voltage-drop circuit 9 and a voltage-drop circuit 10, respectively, and the inputs to the differential amplifier 4 are the mid-point potential of the voltage between the input side lines of the voltage-drop circuits 9 and 10 and the mid-point potential of the voltage between the output side lines of the voltage-drop circuits 9 and 10.

In this exemplary embodiment also, stability is achieved at the point where the positive and negative currents become equal in a manner similar to that, of the first exemplary embodiment shown in FIG. 1. It will suffice if the voltage-drop circuit 9 and voltage-drop circuit 10 are elements in which the drop voltage changes depending upon the current values of the currents that flow through them. Such an element is not readily susceptible to the influence of linearity of the passed-current value and drop voltage.

Although an arrangement having the p-channel FET 5 and n-channel FET 6 has been disclosed in FIGS. 1 and 2, an arrangement equipped with either one of these (i.e., an arrangement having only the p-channel FET 5 or only the n-channel FET 6) may be adopted as a modification.

Figure 3:
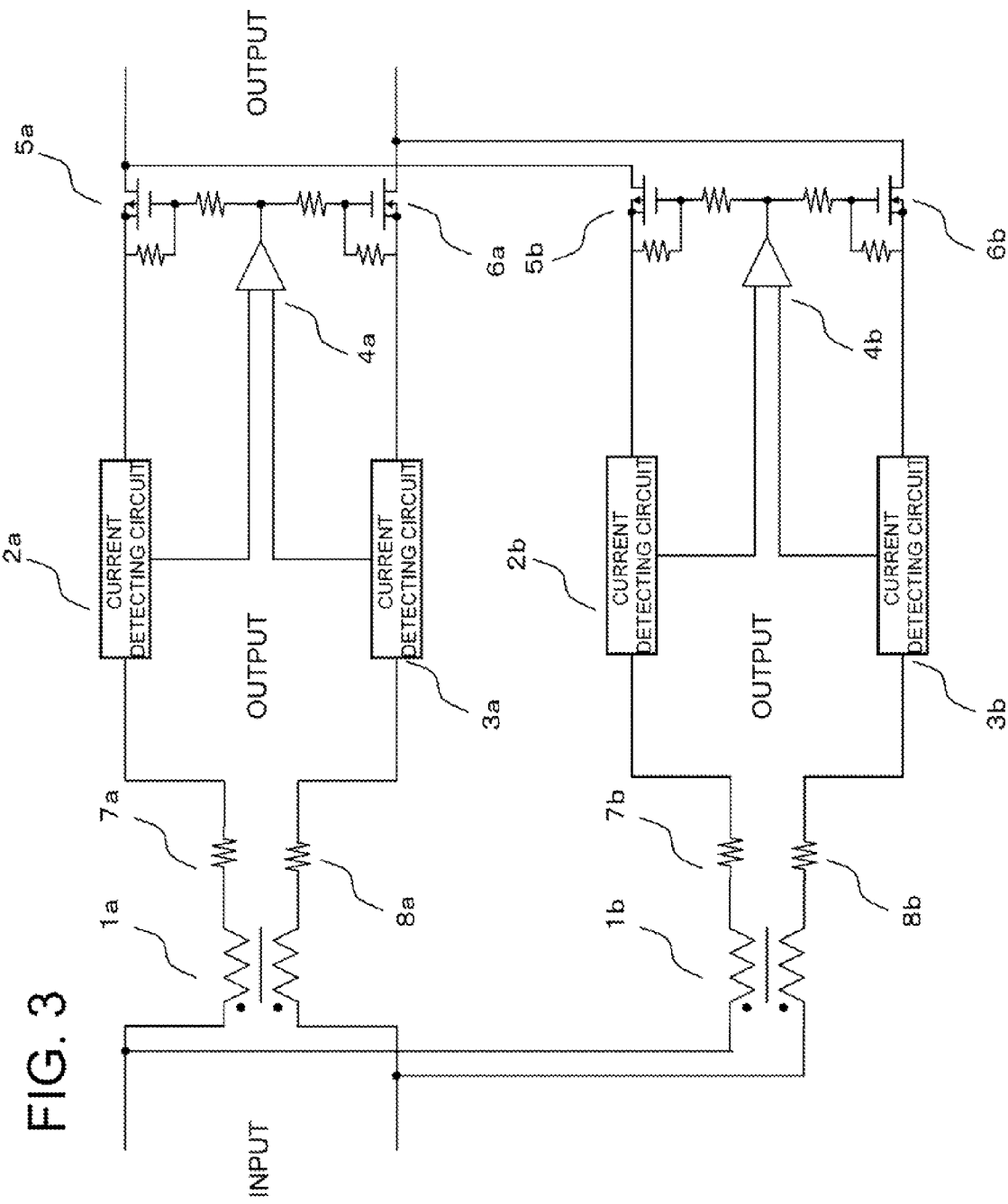
FIG. 3 is a diagram illustrating the configuration of a third exemplary embodiment of the present invention.
Figure 4:
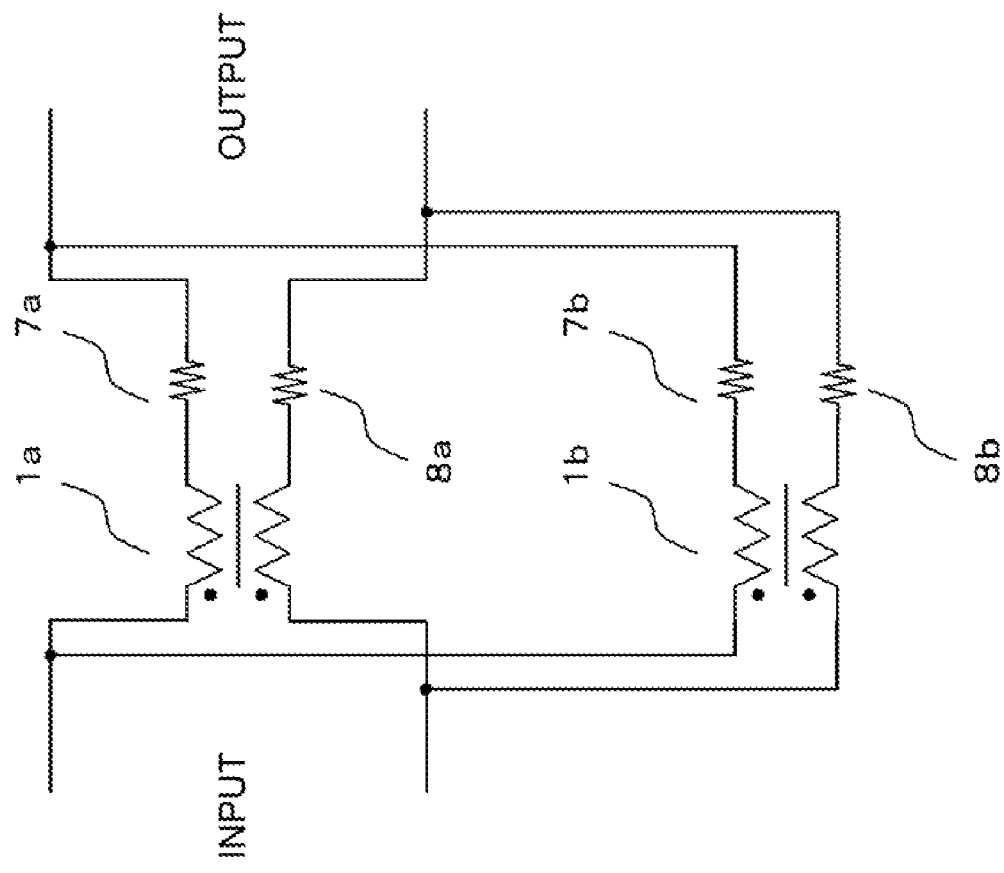
FIG. 4 is a diagram illustrating the configuration of related art.

FIG. 3 is a diagram illustrating the configuration of a third exemplary embodiment of the present invention. As shown in FIG. 3, in this exemplary embodiment, two of the filter circuits of FIG. 1 are arranged in parallel between an input and an output. Control is exercised in such a manner that the positive and negative winding currents of a CMC 1a will balance each other. When the positive and negative winding currents of a CMC 1a are balanced, saturation of the core of the CMC 1a is avoided. Further, control is exercised in such a manner that the positive and negative winding currents of a CMC 1b will balance each other independently of the CMC 1a. When the positive and negative winding currents of a CMC 1b are balanced, saturation of the core of the CMC 1b is avoided.

In accordance with this exemplary embodiment, the currents that flow into the positive- and negative-side windings of the CMC used within the filter circuit are balanced, and a normal filter characteristic is obtained even in a case where a plurality of filter modules are used. By using this arrangement in a filter module the reliability of which is enhanced by redundancy or in a filter module in which large currents are dealt with by a parallel configuration, it is possible to prevent degradation of the filter characteristic.

It should be noted that the disclosures made in Patent Document 1 can be summarized as follows:

parallel-connected switch converters are provided;

the switching frequencies of the plurality of switch converters are made the same;

the switching phase angles of the plurality of switch converters are fixed in a shifted state; and in order to cancel out ripple current efficiently, the respective currents are made the same and normal-mode noise is reduced.

Such arrangement described in Patent Document 1 is entirely different from the filter circuit of the present invention, which prevents magnetic saturation of a CMC for eliminating common-mode noise.

Though the present invention has been described in accordance with the foregoing exemplary embodiments, the invention is not limited to these exemplary embodiments and it goes without saying that the invention covers various modifications and changes that would be obvious to those skilled in the art within the scope of the claims.

It should be noted that other objects, features and aspects of the present invention wilt become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A filter circuit comprising:
a monitoring circuit that monitors positive winding current and negative winding current flowing respectively through a positive winding and a negative winding of a common-mode choke coil; and
an adjusting circuit that a lies an adjustment based on the result of monitoring the positive winding current and the negative winding current in such a manner that balance is achieved between the positive winding current and negative winding current,
wherein the monitoring circuit includes first and second current detecting circuits that detect current values of the positive winding current and negative winding current, respectively,
wherein the adjusting circuit includes:
a differential amplifier that compares the current values detected by the first and second current detecting circuits and produces a signal conforming to the comparison result; and
a first current control element and/or a second current control element inserted into a path of the positive winding current and/or a path of the negative winding current of the common-mode choke coil, the first current control element and/or second current control element each receiving the signal from the differential amplifier and varying a value of current flowing through the path into which the current control element is inserted.

2. A filter circuit comprising:
a monitoring circuit that monitors positive winding current and negative winding current flowing respectively through a positive winding and a negative winding of a common-mode choke coil; and
an adjusting circuit that a lies an adjustment based on the result of monitoring the positive winding current and the negative winding current in such a manner that balance is achieved between the positive winding current and negative winding current
wherein the monitoring circuit includes first and second voltage-drop circuits that output respective voltages conforming to the positive winding current and negative winding current respectively,
wherein the adjusting circuit includes:
a differential amplifier that compares a mid-point potential of the voltage across input side lines of the first and second voltage-drop circuits and a mid-point potential of the voltage across output side lines of the first and second voltage-drop circuits and produces a signal conforming to the result of comparison; and
a first current control element and/or a second current control element inserted into a path of the positive winding current and/or a path of the negative winding current of the common-mode choke coil, the first current control element and/or second current control element each receiving the signal output from the differential amplifier and varying a value of current flowing through the path into which the current control element is inserted.

3. A filter circuit comprising:
a monitoring circuit that monitors positive winding current and negative winding current flowing respectively through a positive winding and a negative winding of a common-mode choke coil; and
an adjusting circuit that a lies an adjustment based on the result of monitoring the positive winding current and the negative winding current in such a manner that balance is achieved between the positive winding current and negative winding current wherein the monitoring circuit includes first and second current detecting circuits that detect current values of the positive winding current and negative winding current, respectively, wherein the adjusting circuit includes:

a differential amplifier that compares the current values detected by the first and second current detecting circuits and produces a signal conforming to the comparison result; and a first current control element and/or a second current control element inserted into a path of the positive winding current and/or a path of the negative winding current of the common-mode choke coil, the first current control element and/or second current control element each receiving the signal from the differential amplifier and varying a value of current flowing through the path into which the current control element is inserted, wherein the first current control element and the second current control elements comprise transistors of mutually opposite conductivity types.

4. A filter circuit comprising:

a monitoring circuit that monitors positive winding current and negative winding current flowing respectively through a positive winding and a negative winding of a common-mode choke coil; and an adjusting circuit that a lies an adjustment based on the result of monitoring the positive winding current and the negative winding current in such a manner that balance is achieved between the positive winding current and negative winding current wherein the monitoring circuit includes first and second voltage-drop circuits that output respective voltages conforming to the positive winding current and negative winding current respectively, wherein the adjusting circuit includes:

a differential amplifier that compares a mid-point potential of the voltage across input side lines of the first and second voltage-drop circuits and a mid-point potential of the voltage across output side lines of the first and second voltage-drop circuits and produces a signal conforming to the result of comparison; and a first current control element and/or a second current control element inserted into a path of the positive winding current and/or a path of the negative winding current of the common-mode choke coil, the first current control element and/or second current control element each receiving the signal output from the differential amplifier and varying a value of current flowing through the path into which the current control element is inserted, wherein the first current control element and the second current control elements comprise transistors of mutually opposite conductivity types.

\* \* \* \* \*